Dec. 20, 1955 T. L. FAWICK 2,727,760
HIGH-SPEED ROTARY FLUID SEAL
Filed Oct. 7, 1950
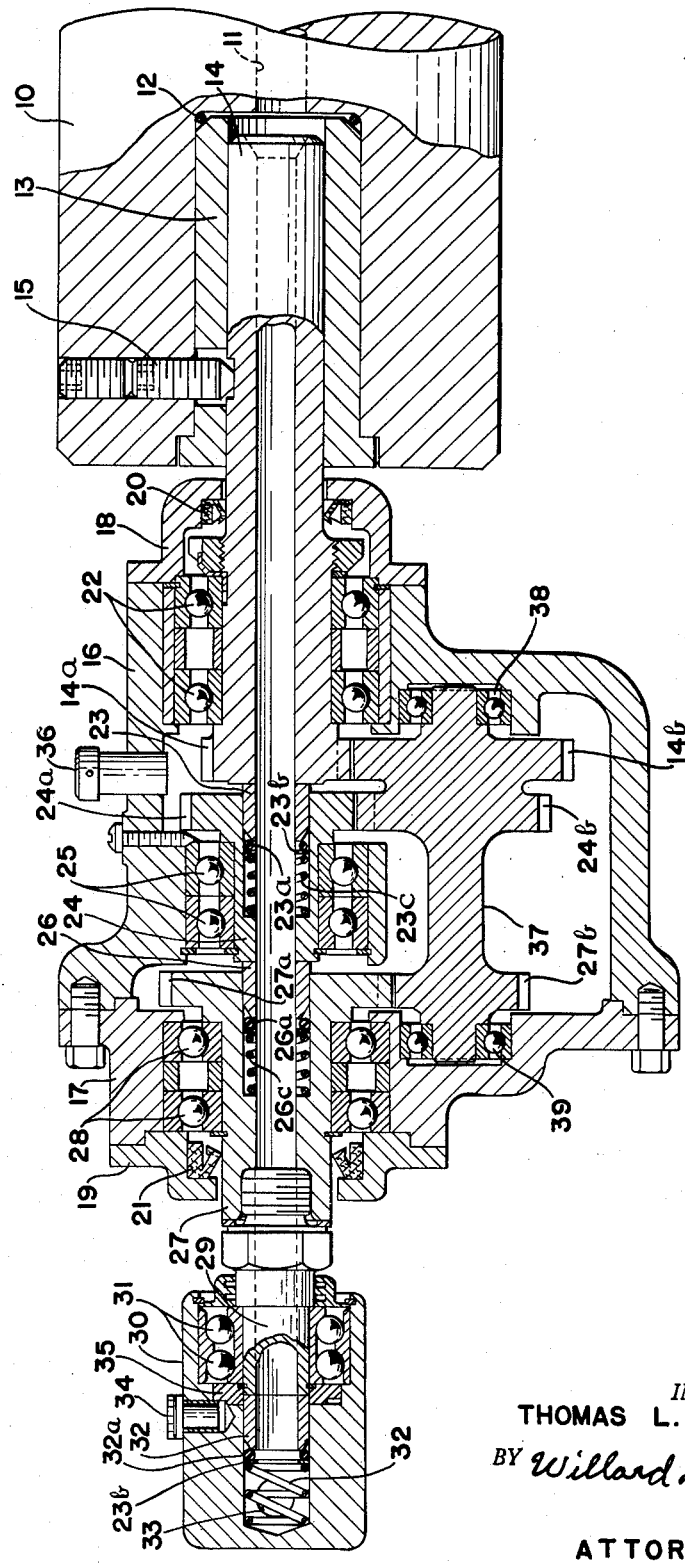
INVENTOR.
THOMAS L. FAWICK
BY Willard D. Eakin
ATTORNEY

United States Patent Office 2,727,760
Patented Dec. 20, 1955

2,727,760

HIGH-SPEED ROTARY FLUID SEAL

Thomas L. Fawick, Cleveland, Ohio, assignor, by mesne assignments, to Fawick Corporation, a corporation of Michigan Application October 7, 1950, Serial No. 188,999

1 Claim. (Cl. 285—96.1)

This invention relates to means for maintaining a sealed connection between a flow channel in a rotary member such as a shaft and a flow channel in a non-rotating member having connection to a source of pressure fluid or of suction or both.

Its chief object is to provide such a connection between channels in two members of which one is required to rotate at high speed in relation to the other. A more specific object is to avoid in an assembly of this type excessively high relative speed of slip-seal members and thus to avoid excessive frictional heating and consequent destruction of lubricant.

A further object is to provide an assembly adapted to have as a part of it a known type of single-ratio seal which is available on the market and has proven to be of high merit.

The single figure of the accompanying drawing is an axial section of an assembly embodying my invention in its preferred form.

The drawing shows a shaft 10 formed with an axial bore 11 requiring to be kept in communication with a source of pressure-fluid or suction, or the two in alternation.

Closely but removably fitted in a counterbore in the end of the shaft and sealed to the shaft by an O-ring 12 is a bushing 13. A nipple 14 is press fitted in the bushing 13 and projects from the end of the shaft. The subassembly consisting of the bushing 13 and nipple 14 are held against axial displacement by a set-screw 15.

A non-rotating housing comprising axially separable sections 16, 17 surrounds and extends beyond the outer end of the nipple 14. Preferably it is provided with means (not shown) for preventing its rotation, and with dust-excluding and oil-retaining end-closures 18, 19 provided with respective oil-seals 20, 21.

The housing 16—17 is accurately journaled upon the nipple 14 by a dual radial-and-thrust bearing 22.

The outer end of the nipple mates in slip-seal relation with a tubular sealing-carbon ring 23 slidably mounted in a socket formed in the adjacent end of a through-passage fluid-conducting member 24 which is accurately journaled in the housing 16—17 by a duel radial-and-thrust bearing 25.

The outer end of the member 24 mates in slip-seal relation with a tubular sealing-carbon 26 slidably mounted in a socket formed in the adjacent end of a through-passage fluid-conducting member 27 which is accurately journaled in the housing 16—17 by a dual radial-and-thrust bearing 28.

The member 27 has screwed into its outer end the rotary nipple 29 of a known type of self-contained single-ratio, rotary seal comprising the rotary nipple 29 and a non-rotating casing 30 in which is journaled the nipple 29 by a duel radial-and-thrust bearing 31. The leftward end of the nipple 29 mates in slip-seal relation with a tubular sealing-carbon 32 slidably mounted in a socket formed in the casing 30.

The casing 30 is formed with an inlet-outlet hole 33 in its wall for connection with the source of pressure-fluid and/or suction. The casing 30 is provided with an oil-fitting 34 for providing oil for the carbon 32 and the bearing 31 through a porous ring 35. The housing 16—17 is provided with an oil-fitting 36 for provision of oil throughout the interior of the housing.

Preferably all of the tubular sealing-carbons 23, 26 and 32 are of the same standard size and shape. Each has a tapered outer end upon the taper of which an O-ring or "soft-packing," $23^a$, $26^a$ or $32^a$, is pressed by a metal washer, $23^b$, $26^b$ or $32^b$, backed by a helical compression spring, $23^c$, $26^c$ or $32^c$, interposed between the washer and the end wall or shoulder of the sealing-carbon's socket.

Preferably gearing is provided for compelling suitable speed of relative rotation between each of the sealing-carbons and the slip-seal nipple-end with which it mates.

For this purpose each of the nipples is provided, within the housing, with a gear portion, $14^a$, $24^a$ or $27^a$, and these, with suitable gear-ratios, are meshed with respective gears $14^b$, $24^b$ and $27^b$ formed upon a small counter-shaft 37 which is journaled in bearings 38, 39 set in suitable sockets in the axially separable housing members 16, 17.

In the operation of the assembly the speed of each nipple with relation to the sealing carbon with which it is mated is much less than would be the case if a single-stage or single-ratio seal were used and consequently the shaft 10 can have a very high rotative speed, in relation to the non-rotating housing 16—17 and the non-rotating casing 30, without excessively heating or excessively wearing any of the sealing-carbons.

By way of example, the present assembly was designed for a shaft requiring to be rotated at 10,000 R. P. M., and the desired speed ratios are provided by giving the gears $24^a$ and $24^b$ the same number of teeth while giving the gears $14^b$ and $14^a$ a 3-to-2 diameter-ratio and the gears $27^b$ and $27^a$ a 2-to-3 diameter-ratio. Thus, while the nipple 14 rotates at 10,000, the carbon 23 and its mounting 24 rotate at 6,666⅔ and the carbon 26 and its mounting 27 rotate at 3,333⅓, in relation to the non-rotating carbon 32, so that each carbon takes care of the same amount of the relative rotation.

My invention is of course not limited to the present number of speed steps nor to the present diameter-ratios of gears. In fact, it may be possible in some installations to omit the gearing, upon the assumption that, in the absence of gearing, any one of the carbons, upon becoming hotter than the others, would have greater resistance to relative rotation of its mating nipple and would thus shift a part of its work to one or more of the other carbons until it became cooler and/or better lubricated. This would be even more pronouncedly the case with carbons and/or backing springs having high heat-expansion.

Various modifications are possible without sacrifice of all of the advantages of the invention and without departure from the scope of the invention as defined in the appended claim.

I claim:

The combination of a hollow machine part journaled for rotation on a fixed axis and having a fluid passage through which its interior is in communication with an axially-facing rotary-slip-seal surface carried by and constrained to rotate with said part and surrounding its axis of rotation, and means for charging the interior of said part with a pressure fluid and venting the fluid therefrom while the said part is rotating, said means comprising a through-passage rotary-slip-seal assembly including a non-rotary, fluid-conducting structure having at one end of its fluid-conducting passage an annular rotary-slip-seal surface axially aligned with and facing toward the defined annular slip-seal surface of said machine part, and at least one rotary-slip-seal assembly mounted between the two defined rotary-slip-seal surfaces and having at its ends respective rotary-slip-seal annular surfaces coaxial with and having rotary-slip-seal fluid-connection to the said defined rotary-slip-seal surfaces respectively, all of the herein defined slip-seal elements constituting a single set of through-apertured elements arranged in series to provide a sealed, single, fluid-conducting conduit extending axially from the said non-rotary fluid-conducting structure to the said machine part, elements of the said series being in radial-and-thrust journaled relation one to another and thus being rotatable at different angular speeds, said combination including a non-rotary frame and fractional-speed-ratio gearing fulcrumed on said frame and so drivingly connecting elements of the said set of elements that one of said elements relatively far from said machine part, in the series of elements, is, by said gearing, compelled to rotate at an angular speed that is slower than the angular speed of one of said elements closer to said machine part in the series.

References Cited in the file of this patent

UNITED STATES PATENTS

| | | |
|---|---|---|
| 839,626 | Nielsen | Dec. 25, 1906 |
| 1,459,454 | Trotter | June 19, 1923 |
| 2,042,691 | William | June 2, 1936 |
| 2,258,008 | Hollatz | Oct. 7, 1941 |
| 2,269,659 | Glowaski | Jan. 13, 1942 |
| 2,402,224 | Hornbostel | June 18, 1946 |
| 2,462,006 | Schmitter et al. | Feb. 15, 1949 |
| 2,558,990 | Stahl et al. | July 3, 1951 |

FOREIGN PATENTS

| | | |
|---|---|---|
| 496,353 | Germany | Apr. 22, 1930 |